United States Patent [19]

Freitag

[11] E Re. 29,497

[45] Reissued Dec. 20, 1977

[54] PISTON ROD SEAL FOR ADJUSTABLE PNEUMATIC SPRING

[75] Inventor: Herbert Freitag, Koblenz-Metternich, Germany

[73] Assignee: Stabilus GmbH, Koblenz-Neuendorf, Germany

[21] Appl. No.: 669,108

[22] Filed: Mar. 22, 1976

Related U.S. Patent Documents

Reissue of:

[64] Patent No.: 3,856,287
Issued: Dec. 24, 1974
Appl. No.: 371,768
Filed: June 20, 1973

[30] Foreign Application Priority Data

June 24, 1972 Germany ..... 2231050

[51] Int. Cl.[2] ..... F16F 5/00
[52] U.S. Cl. ..... 267/64 R; 188/269
[58] Field of Search ..... 267/64 R, 65 R, 64 B, 267/64 A, 65 A; 293/70, 85, 86; 188/317, 269, 322

[56] References Cited

U.S. PATENT DOCUMENTS

| | | | |
|---|---|---|---|
| 2,771,968 | 11/1956 | Mercier | 188/317 |
| 2,930,608 | 3/1960 | Hogan et al. | 188/317 |
| 3,447,645 | 6/1969 | Dorner et al. | 188/269 |
| 3,589,701 | 6/1971 | Gee | 267/64 R |

FOREIGN PATENT DOCUMENTS

| | | | |
|---|---|---|---|
| 1,122,780 | 1/1962 | Germany | 267/64 R |

*Primary Examiner*—James B. Marbert
*Attorney, Agent, or Firm*—Hans Berman

[57] ABSTRACT

In a pneumatic spring of adjustable length, the piston rod is sealed to the cylinder by an annular sealing disc stressed in compression between the inner cylinder wall and a rigid, tubular projection on the radial end wall of the cylinder through which the piston rod extends outward of the cylinder cavity. The sealing disc is axially longer than the projection so that it extends inward of the cavity beyond the projection and carries an annular sealing lip engaging the piston rod only under the fluid pressure in the cylinder cavity, but practically fully relieved by the annular projection from the compressive stresses.

15 Claims, 3 Drawing Figures

PISTON ROD SEAL FOR ADJUSTABLE PNEUMATIC SPRING

Matter enclosed in heavy brackets [ ] appears in the original patent but forms no part of this reissue specification; matter printed in italics indicates the additions made by reissue.

This invention relates to resilient support columns of adjustable length whose visible elements mainly consist of a cylinder and of a piston rod axially projecting from the cylinder, and particularly to a piston rod seal for preventing the escape of fluid under pressure from the column which constitutes a pneumatic spring.

The column or pneumatic spring with the improvement of which this invention is concerned is of the basic known type described, for example, in U.S. Pat. No. 3,447,645 to N. Dorner et al. A piston attached to a piston rod axially divides a cylinder cavity into two compartments filled with a fluid under a pressure higher than atmospheric pressure. A valve which may be operated from outside the cylinder cavity permits the two compartments to be connected. The device constitutes a pneumatic or hydropneumatic spring, depending on the nature of the pressure fluid. The length of the spring varies with a load applied to the piston rod and cylinder, but is constant for any given load as long as the valve remains closed. If the valve is opened, the length of the column or spring under a given load may be varied by changing the fluid distribution in the two compartments.

Columns of the type described have been used successfully as single legs for chairs, for the seats in automotive vehicles, and in many other applications in which a resilient support of adjustable length is convenient. While the columns are structurally similar to certain automotive shock absorbers, they operate under different conditions in that their internal pressure is relatively constant, and that relative axial motions of the cylinder and piston rod are infrequent. Yet, the piston rod must move freely into and out of the cylinder after a prolonged stationary condition, as after storage.

The fluid under high pressure which fills the cylinder cavity and biases the piston rod outward of the cavity is readily confined in the cavity except where the piston rod passes through an aperture in a radial end wall of the cylinder out of the cylinder cavity into the ambient atmosphere. The seal between the piston rod and the cylinder must prevent the escape of pressure fluid, yet must not engage the piston rod with friction sufficient to interfere with axial piston rod movement when such movement is desired during a change in the axial length of the column.

It has been proposed in the German Pat. No. 965,003 to use a piston rod seal in which a fluid-tight connection is partly provided by means of an annular sealing lip. Yet, the known device still relies on a relatively large area of contact between a sealing element and the piston rod, a condition unavoidably causing substantial friction between the movable piston rod and the fixed sealing element.

The object of the invention is the provision of a pneumatic spring of the afore-described type in which a sealing lip is employed in such a manner as to minimize friction between the piston rod and the sealing element.

The sealing arrangement between the piston rod and the cylinder end wall in a pneumatic spring of the invention includes a tubular, rigid member which substantially coaxially envelops the piston rod with sufficient clearance to permit free axial movement of the piston rod through the tubular member. A sealing member of resilient material is formed with an opening therethrough. A first axial portion of the sealing member envelops the tubular member, and a second portion extends from the first portion in a direction inward of the cylinder cavity and includes a lip portion of the sealing member which engages the piston rod.

Other features, additional objects, and many of the attendant advantages of this invention will readily be appreciated as the same becomes better understood by reference to the following detailed description of a preferred embodiment when considered in connection with the appended drawing in which.

Figure 1:
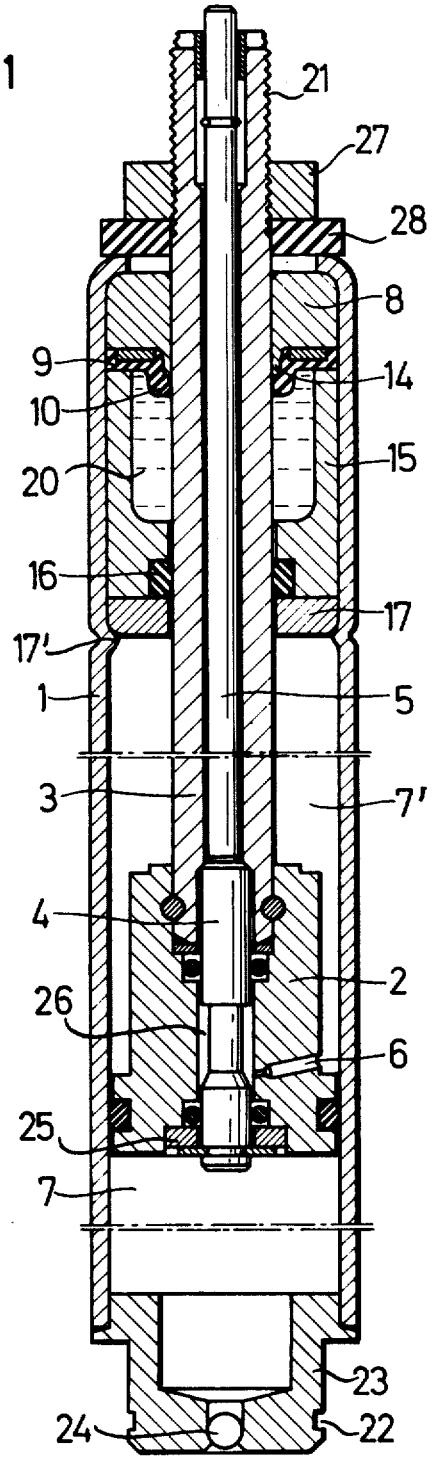
FIG. 1 shows a pneumatic spring of the invention in fragmentary elevational section on its axis.

Referring initially to FIG. 1, there is seen a cylinder 1 whose axial length is substantially greater than is shown in FIG. 1. A piston 2 seals two compartments 7, 7' in the cylinder cavity from each other in the illustrated condition of the apparatus, the compartments being filled with a gas, such as air or nitrogen, under high pressure. A tubular piston rod 3 is fixedly fastened in the cylinder cavity to the pistion 2 and extends outward of the cylinder through an annular, radial end wall 8 of the cylinder.

A valve slide 4 may be shifted axially in the bore of the piston rod 3 by means of an attached operating rod 5 from the illustrated closed position downward, as viewed in FIG. 1, until a circumferential groove 26 in the slide 4 by-passes an annular seal 25 in the piston 2 and thereby permits fluid flow between the compartments 7, 7' through the groove 26 and a radial bore 6 in the piston 2. The apparatus described so far and including the operating rod 5 accessible outside the cylinder 1 is not significantly different from that of the afore-mentioned Dorner et al., patent.

A generally disc-shaped sealing element 9 of oil-resistant synthetic rubber covers the annular, radial face of the end wall 8 and the rim of an approximately cup-shaped spacer 15. The annular chamber 20 in the spacer 15 about the piston rod 3 is filled with hydraulic fluid or lubricating oil. The spacer 15 is held in its axial position by a flat partition ring 17 backed by a circular rib 17' inwardly projecting from the cylinder 1 and formed in the cylinder wall by rolling after assembly. A sealing ring 16 in the apertured bottom of the spacer 15 minimizes or prevents flow of air through the annular clearance spaces between the rod 3 and the ring 17 and spacer 15 respectively.

Threads 21 on the free end portion of the piston rod 3 permit a seat frame to be attached to the piston rod, and a rubber cushion 28 carrying a metallic abutment ring 27 limits the downward movement of the seat frame, and the corresponding movement of the piston rod 3 inward of the cylinder 1. An annular groove 22 in the lower radial end wall 23 of the cylinder 1 permits the cylinder to be attached to the chair base. The gas in the cylinder may be replenished through a check valve 24 in the end wall 23.

Figure 2:
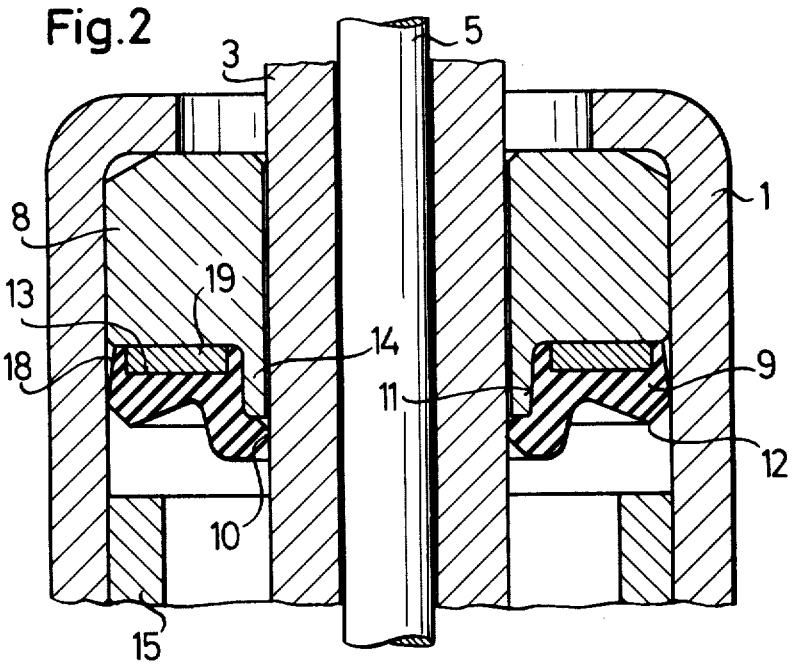
FIG. 2 shows an enlarged portion of the spring of FIG. 1 during its assembly.
Figure 3:
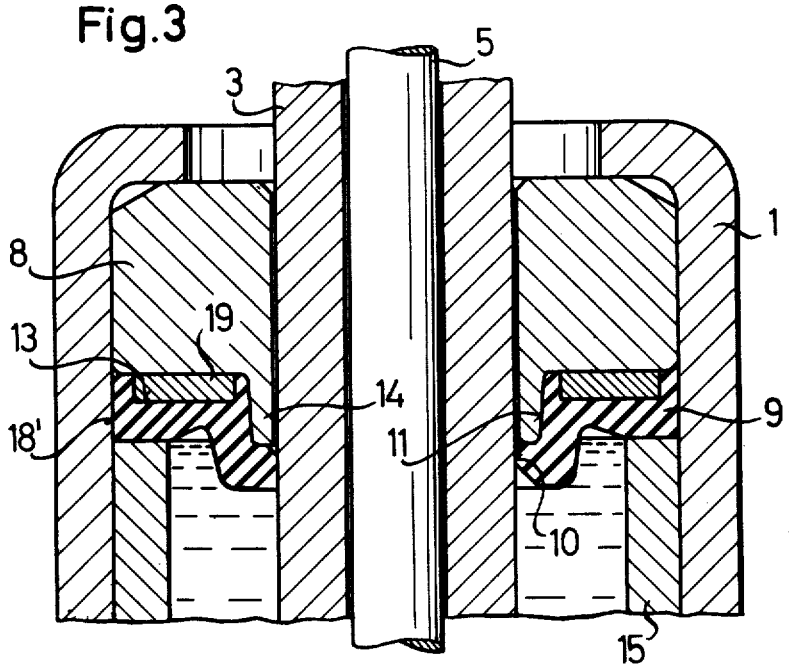
FIG. 3 illustrates the device of FIG. 2 in the fully assembled condition.

This invention is more specifically concerned with the sealing arrangement which prevents fluid leakage along the piston rod 3 through the central aperture in the upper cylinder end wall 8 and is seen in more detail in FIGS. 2 and 3.

A rigid, tubular ring 14 is integrally and coaxially fastened to the end wall 8, and the cylindrical aperture in the wall 8 and the ring 14 is dimensioned to pass the piston rod 3 with adequate clearance for easy axial movement. The radially innermost portion of the sealing element 9 forms an annular lip 10 which engages the piston rod 3 along an axially narrow, annular interface. The lip tapers toward the interface, the two tapering surfaces being inclined at approximate angles of 45° to the axis of the cylinder 1. The lip portion 10 of the element 9 is axially offset inward of the cylinder cavity from the main part of the element and is spaced axially from the rigid ring 14 a small distance much smaller than the axial height of the lip portion.

As is partly shown in FIG. 2, the end wall 8 and associated elements are introduced into the axial portion of the cylinder 1 from below during assembly and are ultimately secured in the position illustrated in FIG. 3 by the rolling of the rib 17.

In the almost fully relaxed condition shown in FIG. 2, the sealing element 9 has an inner cylindrical face 11 which conformingly engages the rigid ring 14 over an axial height which is many times greater than the interface between the lip portion 10 and the piston rod 3, and greater than the greatest axial dimension of the lip portion 10. An annular rib 12 near the outer circumference of the element 9 projects toward the rim of the spacer 15. The outer circumferential face 18 of the element 9 tapers conically in a direction outward of the cylinder cavity. The radial face of the sealing element directed toward the end wall 8 has a groove 13 in which a flat, reinforcing metal ring 19 is received.

When the sealing element 9 is axially compressed between the spacer 15 and the end wall 8 in the assembled condition shown in FIG. 3, it comes under some radial compressive stress between the inner axial wall of the cylinder 1 and the ring 14, as evidenced by the now cylindrical shape of the outer circumferential face 18', but no significant portion of this stress is transmitted to the lip portion 10 which is axially offset from the face 18'. Only the fluid pressure exerted on the radially outer, axial face of the lip portion over an area axially not much longer than the interface of the piston rod 3 and of the lip portion 10 urges the latter into engagement with the piston rod 3.

The fluid pressure is transmitted from the compressed gas in the compartments 7, 7' to the liquid in the chamber 20 by the sealing ring 16 which is tight enough to prevent oil leakage into the compartment 7', but cannot entirely prevent gas from leaking into the chamber 20 where it is dispersed in the oil. The lip portion 10 of the sealing element 9 needs to prevent leakage of liquid only although the cylinder cavity is filled with compressed gas over most of its length, not fully shown in FIG. 1, and is fully capable of performing its task.

Because of the small interface of the lip portion 10 and the piston rod 3, and the relatively low contact pressure, the elastomeric sealing element 9 does not cling to the metal rod 3 even after long storage periods in which they do not move relative to each other. When the valve 4 is opened, the gas pressure in the cylinder 1 immediately expels the piston rod 3 in the absence of an opposing load and thereby causes the column length to be increased. A load only slightly greater than that needed to balance the internal gas pressure is sufficient to cause shortening of the column by moving the piston rod 3 inward of the cylinder 1.

The circumferential portion of the sealing element 9 clamped between the end wall 8 and the rim of the spacer 15 prevents fluid leakage from the cylinder 1 to the ambient atmosphere along the inner axial cylinder wall. The reinforcing ring 19 prevents excessive deformation of the element 9 under the clamping pressure.

The ring 14 which prevents significant radial stresses from being applied to the lip portion 10 is most conveniently made an integral part of the end wall 8, but it may be fixedly attached to the end wall or to any other part of the cylinder 1 without change in function. Actually, it may be replaced by a freely floating insert in the manner of the reinforcing ring 19 and still perform its essential functions of providing a free passage through the sealing element 9 where the lip portion 10 does not engage the piston rod 3 and of relieving the lip portion of most radial pressure.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A pneumatic spring comprising:

a. a cylinder having an axis and bounding a cavity therein;

b. a piston axially slidable in said cavity and separating two compartments of said cavity;

c. valve means operatively interposed between said compartments;

d. valve operating means accessible outside said cavity for moving said valve means toward and away from an open position in which said valve means connects said compartments;

e. a piston rod fixedly fastened to said piston and axially extending therefrom outward of said cavity, said cylinder including an end wall transverse to said axis and formed with an aperture for passage of said piston rod;

f. fluid filling said cavity; and g. sealing means interposed between said end wall and said piston rod for preventing escape of fluid through said aperture, said sealing means including:

1. a rigid tubular member substantially coaxially enveloping said piston rod with sufficient clearance to permit free axial movement of said piston rod through said tubular member, 2. a sealing member of resilient material formed with an opening therethrough, said [tubular] *sealing* member having a first axial portion enveloping said rigid tubular member and a second axial portion extending axially beyond said tubular member in a direction inward of said cavity, 3. said second portion having a radially outer, axially extending face radially spaced from said cylinder and exposed to said fluid, 4. the radially innermost part of said second portion constituting a lip portion, said lip portion being the only part of said sealing member frictionally engaging said piston rod.

2. A spring as set forth in claim 1, wherein said lip portion is axially shorter than said face of said second portion.

3. A spring as set forth in claim 1, wherein said tubular member is fixedly fastened to said cylinder.

4. A spring as set forth in claim 1, wherein said tubular member is fixedly fastened to said end wall.

5. A spring as set forth in claim 4, wherein said lip portion is axially spaced from said tubular member.

6. A spring as set forth in claim 4, wherein said cylinder member has an inner axial face extending about said axis in a closed loop, said sealing member having a circumferential portion engaging said inner face, and said first portion being held under compressive radial stress between said inner [wall] *face* and said tubular member.

7. A spring as set forth in claim 6, wherein said sealing member, when in the relaxed condition, has an annular rib portion radially adjacent said circumferential portion and projecting from said circumferential portion in said direction.

8. A spring as set forth in claim 6, wherein said lip portion is axially offset from said circumferential portion in a direction inward of said cavity.

9. A spring as set forth in claim 8, further comprising an annular partition member fixedly fastened in said cavity and axially interposed between said piston and said end wall, said partition member separating a chamber in said cavity from one of said compartments, said fluid in said compartments essentially consisting of a gas, and the fluid in said chamber essentially consisting of a liquid.

*10. A pneumatic spring comprising:*

*a. a cylinder having an axis and bounding a cavity therein;*

*1. said cylinder having an inner axial face extending about said axis in a closed loop;*

*b. a piston axially slidable in said cavity and separating two compartments of said cavity;*

*c. a piston rod fixedly fastened to said piston and axially extending therefrom outward of said cavity, said cylinder including an end wall transverse to said axis and formed with an aperture for passage of said piston rod;*

*d. fluid filling said cavity; and*

*e. sealing means interposed between said end wall and said piston rod for preventing escape of fluid through said aperture, said sealing means including:*

*1. a rigid tubular member substantially coaxially enveloping said piston rod with sufficient clearance to permit free axial movement of said piston rod through said tubular member,*

*2. a sealing member of resilient material formed with an opening therethrough, said sealing member having a circumferential portion engaging said inner axial face and a first axial portion enveloping said rigid tubular member and held under compressive radial stress between said inner axial face and said tubular member, said sealing member having a second axial portion extending axially beyond said tubular member in a direction inward of said cavity,*

*3. said second portion having a radially outer, axially extending face radially spaced from said cylinder and exposed to said fluid,*

*4. the radially innermost part of said second portion constituting a lip portion, said lip portion being the only part of said sealing member frictionally engaging said piston rod and being axially spaced from said tubular member,*

*5. said sealing member, when in the relaxed condition having an annular rib portion radially adjacent said circumferential portion and projecting from said circumferential portion in said direction.*

*11. A pneumatic spring comprising:*

*a. a cylinder having an axis and bounding a cavity therein;*

*1. said cylinder having an inner axial face extending about said axis in a closed loop;*

*b. a piston axially slidable in said cavity and separating two compartments of said cavity;*

*c. a piston rod fixedly fastened to said piston and axially extending therefrom outward of said cavity, said cylinder including an end wall transverse to said axis and formed with an aperture for passage of said piston rod;*

*d. fluid filling said cavity;*

*e. sealing means interposed between said end wall and said piston rod for preventing escape of fluid through said aperture, said sealing means including:*

*1. a rigid tubular member substantially coaxially enveloping said piston rod with sufficient clearance to permit free axial movement of said piston rod through said tubular member,*

*2. a sealing member of resilient material formed with an opening therethrough, said sealing member having a circumferential portion engaging said inner axial face and a first axial portion enveloping said rigid tubular member and held under compressive radial stress between said inner axial face and said tubular member, said sealing member having a second axial portion extending axially beyond said tubular member in a direction inward of said cavity,*

*3. said second portion having a radially outer, axially extending face radially spaced from said cylinder and exposed to said fluid,*

*4. the radially innermost part of said second portion constituting a lip portion axially offset from said circumferential portion in a direction inward of said cavity, said lip portion being the only part of said sealing member frictionally engaging said piston rod and being axially spaced from said tubular member; and*

*f. an annular partition member fixedly fastened in said cavity and axially interposed between said piston and said end wall,*

*1. said partition member separating a chamber in said cavity from one of said compartments,*

*2. said fluid in said compartments essentially consisting of a gas, and the fluid in said chamber essentially consisting of a liquid.*

*12. A pneumatic spring comprising:*

*a. a cylinder having an axis and bounding a cavity therein;*

*b. a piston axially slidable in said cavity and separating two compartments of said cavity;*

*c. a piston rod fixedly fastened to said piston and axially extending therefrom outward of said cavity, said cylinder including an end wall transverse to said axis and formed with an aperture for passage of said piston rod;*

*d. fluid filling said cavity; and*

*e. sealing means interposed between said end wall and said piston rod for preventing escape of fluid through said aperture, said sealing means including:*

*1. a rigid tubular member substantially coaxially enveloping said piston rod with sufficent clearance*

*to permit free axial movement of said piston rod through said tubular member,*

2. *a sealing member of resilient material formed with an opening therethrough, said sealing member having a first axial portion enveloping said rigid tubular member and a second axial portion extending axially beyond said tubular member in a direction inward of said cavity,*
3. *said first axial portion having an outer circumferential face engaging the inner wall of the cylinder and, when in the relaxed condition, an annular rib radially adjacent said outer circumferential face and projecting in said axially inward direction,*
4. *means coacting between the cylinder and said annular rib to hold said first axial portion in compressive radial stress between said cylinder inner wall and said tubular member,*
5. *said second axial portion having a radially outer, axially extending face radially spaced from said cylinder inner wall and exposed to said fluid, and*
6. *the radially innermost part of said second portion constituting a lip portion, said lip portion being the only part of said sealing member frictionally engaging said piston rod.*

*13. A pneumatic spring including a cylinder having a closed end and an open end, a piston slidingly received within the cylinder, a piston rod connected to the piston and extending through the open end of the cylinder, a working fluid under pressure in the cylinder for coacting with the piston, and means interposed between the cylinder and the piston rod at said open end for sealing against loss of said working fluid, wherein the improvement in said sealing means comprises:* a. *a rigid tubular member substantially coaxially enveloping said piston rod with sufficient clearance to permit free axial movement of said piston rod through said tubular member;*
b. *a sealing member of resilient material formed with an axial opening therethrough, said sealing member having a first annular portion enveloping said rigid tubular member and a second annular portion of reduced outer diameter extending axially inwardly from said first annular portion, said second annular portion having a radially outer, axially extending face radially spaced from the inner wall of the cylinder and exposed to the pressure of said working fluid, said second annular portion terminating at the axially innermost end thereof in a lip portion which extends radially inwardly towards and engages said piston rod, said lip portion being the only part of said sealing member frictionally engaging said piston rod;*
c. *means for compressing said first annular portion of said sealing member between the inner wall of the cylinder and said tubular member; and*
d. *means defining a lubricating chamber axially inwardly of said sealing member, said chamber being open to said sealing member and to said piston rod and containing a lubricating fluid for lubricating said piston rod and for transmitting the pressure of said working fluid to said second annular portion of the sealing member.*

*14. A spring as set forth in claim 13, wherein said lubricating fluid comprises a liquid and said working fluid comprises a gas, whereby said sealing member seals against the leakage through said open cylinder end of a liquid notwithstanding that the working fluid is a gas.*

*15. A spring as set forth in claim 15, wherein the radially inner end of said lip portion tapers axially towards the piston rod so as to frictionally engage the piston rod along only an axially narrow interface.*

* * * * *